United States Patent
Moser et al.

(10) Patent No.: US 10,369,519 B2
(45) Date of Patent: Aug. 6, 2019

(54) METHOD FOR REMOVING MERCURY FROM FLUE GASES OF INCINERATION PLANTS

(71) Applicant: RWE Power Aktiengesellschaft, Essen (DE)

(72) Inventors: Peter Moser, Cologne (DE); Knut Stahl, Hamm (DE)

(73) Assignee: RWE POWER AKTIENGESELLSCHAFT, Essen (DE)

( * ) Notice: Subject to any disclaimer, the term of this patent is extended or adjusted under 35 U.S.C. 154(b) by 0 days.

(21) Appl. No.: 15/737,926

(22) PCT Filed: May 30, 2016

(86) PCT No.: PCT/EP2016/062122
§ 371 (c)(1),
(2) Date: Dec. 19, 2017

(87) PCT Pub. No.: WO2016/202563
PCT Pub. Date: Dec. 22, 2016

(65) Prior Publication Data
US 2018/0169578 A1 Jun. 21, 2018

(30) Foreign Application Priority Data
Jun. 19, 2015 (DE) .................. 10 2015 211 326

(51) Int. Cl.
*B01D 53/80* (2006.01)
*B01D 53/50* (2006.01)
(Continued)

(52) U.S. Cl.
CPC .............. *B01D 53/80* (2013.01); *B01D 53/50* (2013.01); *B01D 53/64* (2013.01); *B01J 20/20* (2013.01);
(Continued)

(58) Field of Classification Search
CPC ............... B01D 53/04; B01D 53/8665; B01D 2253/102; B01D 2257/60;
(Continued)

(56) References Cited

U.S. PATENT DOCUMENTS 5,405,812 A * 4/1995 Bruggendick ......... B01D 53/08
422/177
5,811,066 A 9/1998 Winkler et al.
(Continued)

FOREIGN PATENT DOCUMENTS

CA 1256848 A * 7/1989 .............. B01J 20/20
DE 3941894 6/1991
(Continued)

OTHER PUBLICATIONS

English translation of International Search Report from corresponding PCT Appln. No. PCT/EP2016/062122 dated Sep. 12, 2016.
(Continued)

*Primary Examiner* — Timothy C Vanoy
(74) *Attorney, Agent, or Firm* — Grossman, Tucker, Perreault & Pfleger, PLLC

(57) ABSTRACT

The invention relates to a process for removing mercury from flue gases from combustion plants, wherein the process comprises providing an adsorbent based on carbon, producing an aqueous suspension comprising the adsorbent, introducing the suspension into the flue gas stream from the combustion plants into the dry gas phase of the flue gas which is undersaturated with water vapor and loading the adsorbent with mercury over a predetermined reaction path, keeping the mercury-laden adsorbent out of the flue gas stream and landfilling or regenerating the mercury-laden adsorbent.

12 Claims, 1 Drawing Sheet

(51) Int. Cl.
    *B01D 53/64*     (2006.01)
    *B01J 20/34*     (2006.01)
    *B01J 20/30*     (2006.01)
    *B01J 20/20*     (2006.01)
    *B01J 20/28*     (2006.01)

(52) U.S. Cl.
    CPC ..... *B01J 20/28004* (2013.01); *B01J 20/3021* (2013.01); *B01J 20/3416* (2013.01); *B01D 2253/102* (2013.01); *B01D 2257/302* (2013.01); *B01D 2257/602* (2013.01); *B01D 2258/0283* (2013.01)

(58) Field of Classification Search
    CPC ....... B01D 2257/602; B01D 2258/0283; B01J 19/00; B01J 20/20; B01J 2208/00; C01B 32/30; C01B 32/312; C01B 32/318
    See application file for complete search history.

(56) References Cited

U.S. PATENT DOCUMENTS

| | | | |
|---|---|---|---|
| 6,818,043 B1 | 11/2004 | Chang et al. | |
| 7,713,503 B2* | 5/2010 | Maly | B01D 53/10 |
| | | | 110/345 |
| 7,722,843 B1 | 5/2010 | Srinivasachar | |
| 10,029,235 B2* | 7/2018 | Adler | B01J 20/28004 |
| 2008/0289498 A1* | 11/2008 | Heschel | B01D 53/02 |
| | | | 95/134 |
| 2011/0250110 A1 | 10/2011 | Keiser et al. | |
| 2013/0089479 A1 | 4/2013 | Ergang et al. | |
| 2014/0374655 A1* | 12/2014 | Mimna | B01J 20/22 |
| | | | 252/193 |

FOREIGN PATENT DOCUMENTS

| | | |
|---|---|---|
| DE | 4034498 | 3/1992 |
| DE | 19940683 | 3/2001 |
| DE | 102007042297 | 3/2008 |

OTHER PUBLICATIONS

English translation of International Preliminary Report on Patentability from corresponding PCT Appln. No. PCT/EP2016/062122 dated Dec. 6, 2017.

\* cited by examiner

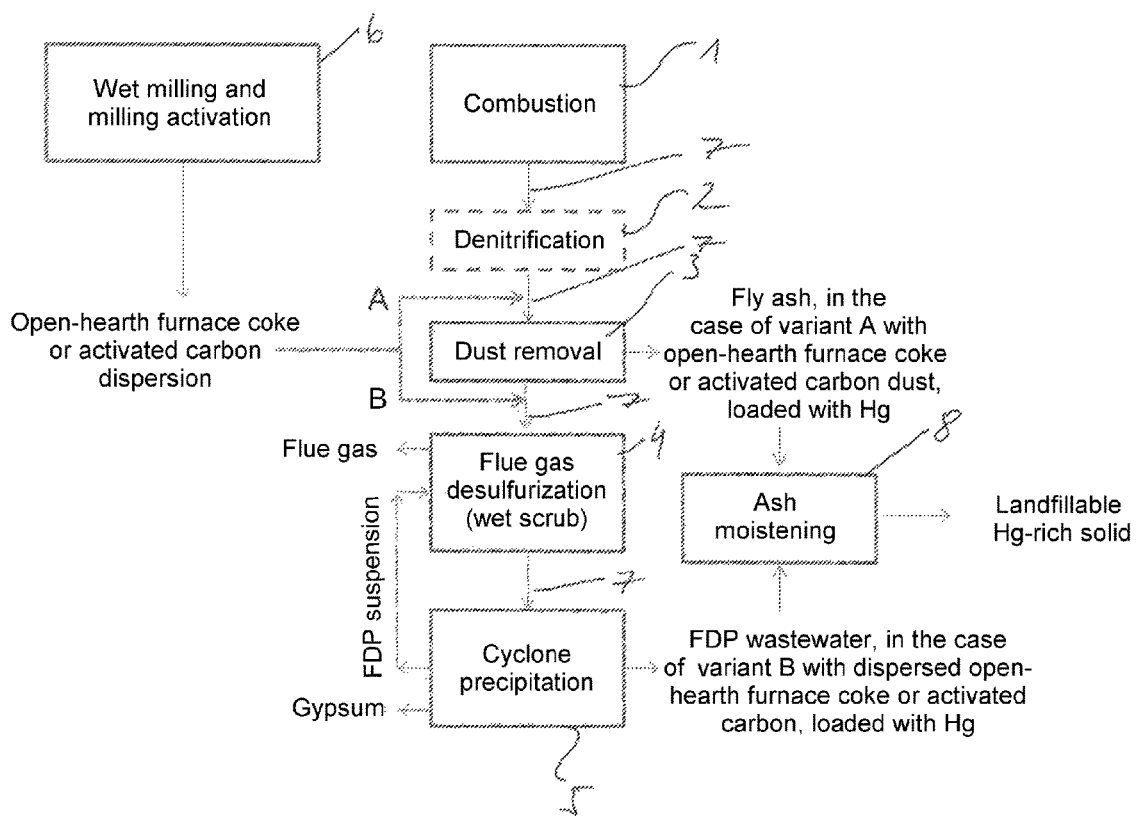

METHOD FOR REMOVING MERCURY FROM FLUE GASES OF INCINERATION PLANTS

FIELD

The invention relates to a process for removing mercury from flue gases of combustion plants, for example coal-fired power stations, waste incineration plants or the like.

BACKGROUND

Owing to the relatively high toxicity of mercury, especially organically bound mercury which is taken up directly or indirectly via the food chain by human beings, there are relatively strict limits to the legally permissible emissions of mercury from combustion plants and power stations.

Mercury and mercury compounds are essentially ubiquitous and more or less present in all organic or fossil fuels. Combustion of fossil fuels mobilizes mercury and mercury is released in gaseous form via the offgas and also in dissolved form via the wastewater streams or in solid form via sludges into the environment. This results in the necessity of keeping mercury out of the flue gas from combustion plants.

Mercury is present in essentially two chemical forms, namely as elemental mercury and as oxidized divalent mercury, in the flue gas from combustion plants and especially in the flue gas from coal-fired power stations. Depending on the mercury, halogen and sulfur content of the fuel used and the process steps and also conditions in the flue gas treatment up to release into the environment, a particular ratio of the proportions of oxidized and elemental mercury is established. The oxidation state of the mercury and the ratio of the species is critical to the type and effectiveness of a mercury removal technology. In contrast to elemental mercury, oxidized mercury is water-soluble and can therefore be scrubbed out from the flue gas by means of a wet gas scrub, for example by means of a wet flue gas desulfurization plant, and removed from the process by means of adsorbents or by means of ion exchangers or organic precipitants and flocculants and converted into a solid which can be disposed of in a landfill.

However, this procedure is not suitable for removing elemental mercury from the flue gas. If the proportion of elemental mercury in the flue gas is high, the mercury can be converted by, for example, addition of oxidants into a soluble oxidized species which can then be removed from the flue gas in a downstream wet flue gas scrub.

In the case of fluidized-bed boilers with desulfurization by the dry additive process and other plants without a wet scrub, it is prior art to blow adsorbents in undoped form or doped with bromides or with sulfur into the flue gas stream and mechanically separate the adsorbents loaded with mercury from the flue gas stream, for example by means of fabric filters or by means of electrostatic dust precipitators.

These processes of dry entrained-flow adsorption using carbon-containing adsorbents incurs a certain risk to operational safety of the adsorption plants because of the fundamental ignition tendency of carbon-containing adsorbents. For this reason, numerous efforts are known to have been made to replace carbon-containing adsorbents by other adsorbents, for example by zeolites.

Despite all efforts to dispense with organic adsorbents for dry offgas purification, these organic adsorbents have the advantage of an extraordinarily high adsorption capability.

A process for dry purification of offgases from thermal processes using dry pulverulent sorbents based on brown coal coke is known, for example, from DE 199 40 683 A1. The sorbents are introduced in powder form into the offgas stream and entrained by the latter in such a way that adsorption of the harmful constituents of the offgas occurs on the sorbents present in the form of a dust cloud in the offgas stream. In order to satisfy requirements in respect of fire and explosion protection, the process according to DE 199 40 683 A1 provides for zeolites or zeolite-containing mineral rock to be employed as surface-active constituent in admixture with brown coal coke as adsorbent and for the mixing ratio between the brown coal coke and zeolite to be set as a function of the type, composition and amount of the process dust present in the offgas in such a way that it is ensured that the solids are made inert.

As an alternative to the use of brown coal coke as adsorbent, the use of activated carbon is in principle also known for dry offgas purification, for example from DE 40 34 498 A1. Activated carbon is produced in a complicated manner from coconut shells by pyrolysis and is therefore expensive, so that efforts were always made in the prior art to keep the use of activated carbon as sparing as possible.

A process for removing mercury from flue gases from combustion plants is known from DE 39 41 894 A1. Further prior art is known from the documents U.S. Pat. Nos. 5,811,066, 7,722,843 B1, 6,818,043 B1 and DE 10 2007 042 297 A1.

SUMMARY

It is an object of the invention to provide a process for removing mercury from flue gases from combustion plants, by means of which, in particular, even elemental mercury can be kept out of the flue gas stream and which can be carried out safely and inexpensively. The process should, in particular, be safe from fire protection points of view.

A further object of the invention is to provide a process of this type by means of which increased degrees of removal of mercury compared to the known process can be achieved.

One aspect of the invention relates to a process for removing mercury from flue gases from combustion plants, which comprises the following process steps:

a) providing an adsorbent from the group consisting of activated carbon, activated coke, molecular sieves, carbon molecular sieves and mixtures of the above-mentioned adsorbents, b) producing an aqueous suspension comprising the adsorbent, c) introducing the suspension into a flue gas stream from the combustion plant into the dry, water vapor-undersaturated gas phase of the flue gas and loading the adsorbents with mercury over a predetermined reaction path, d) keeping the adsorbent loaded, in particular, with mercury out of the flue gas stream by means of one or more removal methods selected from the group consisting of a dry offgas purification and a wet offgas purification and e) landfilling or regenerating the adsorbent loaded, in particular, with mercury.

The process steps a) to e) are preferably carried out in the order in which they are listed above.

The invention can be summarized by saying that an adsorbent based on carbon is injected in the form of an aqueous suspension into the flue gas stream, preferably into the comparatively dry and hot flue gas stream upstream of a wet flue gas scrub. In this way, a reduction in mercury emissions can be achieved by means of entrained flow adsorption by carbon-containing adsorbents, with, unlike in the case of the known dry additive processes, the adsorbent or adsorbents not being blown as dry dust by means of carrier air into the flue gas stream but instead as aqueous suspension. This has the particular advantage that safety problems in storage and blowing-in of the adsorbent do not occur.

On injection of the aqueous suspension comprising the adsorbent, which can be effected in the countercurrent direction or in the concurrent direction relative to the flue gas stream, the suspension droplets formed are entrained by the hot flue gas. As a result of the contact of the suspension droplets or of the wet adsorbent particles with the flue gas, the temperature of the droplets or particles initially increases quickly and then briefly remains constant at about 100° C. due to evaporation of the water of the suspension on its continued passage over the reaction path. The temperature remains constant as long as the liquid in the porous adsorbent can be transported by capillary forces to the particle surface and vaporizes there.

Heat transfer occurs convectively from the flue gas to the suspension droplets. Firstly, the vapor is formed only at the surface and the heat flows solely through the Prandtl gas boundary layer adhering to the adsorbent particles, so that the heat transfer coefficient is equal to the heat transmission coefficient. In the case of adsorbent particles which have already been dried, the vapor is formed in the particle or in the interior of the pores. The heat firstly has to penetrate through a Prandtl gas boundary layer and subsequently be conducted further in the capillaries of the adsorbent. In the first drying phase, vaporization is dependent only on the resistances of the surrounding flue gas phase. Only when a material-dependent residual moisture content is reached does the temperature of the now dried adsorbent particles increase again. Sufficient liquid can no longer be transported to the surface and the drying front travels into the interior of the particle. The vapor has to get to the particle surface by diffusion.

The heat necessary for vaporization has to be transported mainly by thermal conduction to the drying front. In the case of very narrow pores, as are found, for example, in active carbons and active cokes, diffusion is hindered by the walls and the diffusion coefficient decreases with the pore diameter. Owing to the rapid heating and the associated sudden vaporization of the water bound in the capillaries in the interior of the very small adsorbent particles which are dry on the surface, fragmentation of the particles with enlargement of the surface area available for the adsorption of mercury can advantageously occur, as a result of which the adsorption capability is significantly increased.

Especially in the phase directly after suspension droplet formation and heating by contact with the flue gas, it is possible and advantageous for $SO_2$ (sulfur dioxide) to go over from the flue gas (typical $SO_2$ contents in the flue gas are from about 1500 to 8000 mg/m$^3$) into the liquid phase of the droplet and subsequently to react further to form $H_2SO_4$ as a result of the residual oxygen content present in the flue gas, which allows at least partial chemisorption of the mercury or even oxidation of elemental mercury. In-situ sulfating takes place thereby. In particular, mercury compounds which are already oxidized, for example $HgCl_2$ or $Hg_2Cl_2$, can be dissolved in the liquid phase still present and be concentrated ever further with increasing degree of drying until they precipitate as solid on the absorbent particles.

The above-described process is advantageous for binding the unoxidized mercury because the temperature of the adsorbent particles can be maintained for longer than in the case of dry blowing-in below 150° C., which aids physisorption and reduces reemissions.

For the purposes of the present invention, a reaction path is a predetermined path within a flue gas channel on the combustion plant before injection of the suspension up to the keeping-out of the then dried and mercury-laden adsorbent particles.

In the process according to the invention, a carbon-enriched adsorbent which is based on brown coal and has been activated in the absence of oxygen is used as adsorbent according to process step a). Particular preference is given to a brown coal coke or open-hearth furnace coke. The use of a carbon-enriched adsorbent which is based on brown coal and has been activated in the absence of oxygen has the advantage that this adsorbent comprises a higher proportion of mesopores and macropores, which allow ready accessibility to the internal surface area, compared to conventional activated carbons.

It is particularly advantageous for the adsorbent for producing the suspensions in process step b) to be wet milled, for example to an average particle diameter in the range from 10 to 20 μm. Particularly when using brown coal coke, the adsorptivity of the brown coal coke is significantly improved when it is milled to a particle diameter in the range from 10 to 20 μm. The introduction of the suspension according to process step c) is advantageously effected by injection into a flue gas channel of the combustion plant, preferably using spray nozzles distributed over the cross section of the flue gas channel. Both single-fluid nozzles and two-fluid nozzles are possible as spray nozzles. The spray nozzles can be installed comparatively simply on nozzle stems in the cross section of the flue gas channel, so that a uniform distribution of the suspension over the entire cross section of the flue gas channel is achieved.

The injection can be provided upstream or downstream of a heat exchanger arrangement for moving heat in the flue gas channel Systems for moving heat in flue gas channels are used, for example, for taking the heat content of the flue gases out for the purpose of preheating boiler feed water or for the purpose of preheating combustion air.

The injection of the suspension is not critical in respect of any heat moving systems provided.

An important aspect of the present invention is the vaporization of the suspension in the flue gas channel.

The suspension can comprise from 3 to 30% by weight of solid, preferably from 5 to 15% by weight of solid, more particularly preferably about 10% by weight of solid.

Previous doping of the adsorbent with, for example, sulfur or sulfuric acid is not necessary, but is within the scope of the present invention.

In the process of the invention, the process comprises a wet flue gas desulfurization and the introduction of the suspension as per process step c) into the dry, hot flue gas is effected upstream, in the flow direction of the flue gas, of the flue gas desulfurization, preferably at a temperature of the flue gas in the range from 100° C. to 220° C. at which the flue gas stream is undersaturated with water vapor, so that the water of the suspension can vaporize comparatively quickly and the above-described effects occur. Introduction of the suspension can occur in the flow direction or counter to the flow direction of the flue gas.

In a further variant of the process of the invention, the process comprises a dry keeping-out of the mercury-laden adsorbent as per process step d), using at least one filter device selected from the group consisting of electrofilters, centrifugal precipitators, woven fabric filters, tube filters, filter cloths, bag filters and candle filters. However, as an alternative, the suspension can be introduced into the flue gas channel downstream, in the flow direction of the flue gas, of a dust removal or filter device provided there, so that wet removal of the adsorbent occurs in the downstream flue gas desulfurization plant. In this case, the loaded adsorbent would be discharged together with the scrubbing suspension from the bottom of the scrubbing vessel of the flue gas desulfurization plant. Such a scrubbing suspension is a suspension comprising lime and/or gypsum. As scrubbing suspension, it is possible to provide, for example, a limestone suspension which, for example, reacts with the sulfur dioxide present in the flue gas or combustion offgas to form $CaSO_3$ and further oxidation to form $CaSO_4$. Calcium sulfate is generally referred to as gypsum. The suspension collected at the bottom of the scrubbing vessel or in the scrubbing stream will contain both milk lime ($CaOH_2$ (slaked lime/calcium hydroxide)) and gypsum ($CaSO_3$) which has already reacted with $SO_2$. The scrubbing suspension is taken off from the bottom of the scrubbing vessel and conveyed by means of a circulation pump to the top of the scrubbing vessel (upper end) and there trickled and sprayed over a plurality of spray levels. Part of the scrubbing suspension is taken off from the bottom, with the gypsum being thickened by means of at least one hydrocyclone. The thickened gypsum stream is taken off as underflow and subsequently dewatered, for example by means of belt filters or centrifuges. The cyclone precipitation can be carried out in such a way that the mercury-laden adsorbent is dispersed in the wastewater of the flue gas desulfurization plant or of the scrubbing vessel. A moistening of ash resulting from dust removal from the flue gas can, for example, be carried out using this dispersion or suspension. In this way, the mercury bound to the adsorbents is incorporated into the ash to give a mercury-rich solid which can be disposed of in a landfill.

In one variant of the process of the invention, halides selected from the group consisting of iodides, chlorides, sodium bromide, calcium bromide and hydrogen bromide can be added to the suspension before process step c). In this way, prior doping of the carbon-containing adsorbent is achieved, as a result of which the effectiveness of keeping out mercury is further increased because the mercury is bound more strongly to the surface of the adsorbent by chemisorption.

The milling of the adsorbent is advantageously carried out using a ball mill, in particular using a stirred ball mill. Ball mills of this type consist of a usually cylindrical vessel which is arranged vertically or essentially horizontally and is filled to an extent of from 70 to 90% with milling media composed of ceramic materials. The suspension of material being milled is pumped continuously through the milling chamber. Here, the suspended solids are comminuted by and suspended or dispersed by impact and shear forces between the milling media.

The milling fineness is determined by the residence time of the material being milled in the mill. A separation of the fine fraction from the coarser fraction of the output from the mill can, for example, be carried out by means of a suitable separation system, with the coarse fraction then being recirculated to the mill again.

A disk stirred ball mill, for example, has been found to be particularly suitable for milling the adsorbents.

Such disk stirred ball mills are commercially available from, for example, NETZSCH-Feinmahltechnik GmbH.

The milling result within the mill depends on the degree of fill with the milling media, on the diameter of the milling media and on the mass of the milling media.

The desired milling fineness is ensured via the gap width of a separation apparatus and via the size of the milling media.

As spray nozzles, it is advantageous to employ single-fluid nozzles which can readily handle the abovementioned suspension having the abovementioned water content and having the abovementioned milling fineness.

The process of the invention is advantageously provided as process for removing mercury from flue gases from coal-fired power stations having wet flue gas desulfurization.

BRIEF DESCRIPTION OF THE DRAWING

The invention will be illustrated below with the aid of a working example shown in the drawing.

FIG. 1 is a process flow diagram roughly schematically indicating the process procedure.

DETAILED DESCRIPTION

A combustion plant, for example in the form of a steam generator of a coal-fired power station or in the form of a waste incineration plant is denoted by 1. A denitrification apparatus 2 is arranged downstream of the combustion plant 1. The denitrification apparatus 2 is optional.

In the combustion plant 1, fossil or organic fuels are reacted thermally with production of flue gas which is, for example, subjected to catalytic reduction of the nitrogen content in the denitrification apparatus 2.

After denitrification in the denitrification apparatus 2, the flue gas is conveyed to an electrofilter 3. In the electrofilter 3, solid particles entrained in the flue gas are precipitated as fly ash. Instead of an electrofilter, it is possible to provide, as mentioned at the outset, other precipitation apparatuses or dust removal apparatuses.

Downstream of the electrofilter 3 there is a flue gas desulfurization plant 4 (FDP) which is configured as a conventional wet scrub. The flue gas desulfurization plant 4 comprises at least one scrubbing tower having a top and a bottom. In the scrubbing tower, a scrubbing suspension is injected and converted into downward-traveling droplets in the region of the top. The flue gas is fed into the scrubbing tower directly above the bottom. Within the scrubbing tower, the flue gas is conveyed in countercurrent to the scrubbing suspension raining down. The flue gas leaves the scrubbing tower at its top, with the customary droplet precipitation internals and stirring devices also being provided within the scrubbing tower.

A cyclone precipitator 5 is installed downstream of the flue gas desulfurization plant 4. The scrubbing suspension (FDP suspension) is conveyed from the bottom of the flue gas desulfurization plant 4 to the cyclone precipitator 5. The cyclone precipitator 5 can comprise one or more hydrocyclones, the underflow of which contains the relatively coarse gypsum crystals in an increased concentration and the overflow of which contains finer particles, for example adsorbent particles.

The process of the invention comprises provision of open-hearth furnace coke which is milled in a wet milling apparatus 6 to give a fluid suspension. The fluid suspension comprises water and open-hearth furnace coke, with, for example, the open-hearth furnace coke being able to make up about 10% by weight of the fluid suspension.

The open-hearth furnace coke suspension (optionally also activated carbon suspension) is then injected by means of nozzle stems (not depicted) into a flue gas channel 7, which is shown only schematically, of the combustion plant 1, within a temperature window of the flue gas from 100° C. to 220° C.

The accompanying flow diagram depicts two variants of the introduction of the water/adsorbent suspension into the flue gas channel 7; in variant A, the introduction into the flue gas channel 7 is carried out directly upstream of the dust removal apparatus or upstream of the electrofilter 3, and according to variant B, the introduction of the water/adsorbent suspension is carried out directly downstream of the dust removal apparatus or the electrofilter 3 and upstream of the flue gas desulfurization plant 4. In this context, directly means that a predetermined reaction path is provided between the point of introduction into the flue gas channel 7 and the electrofilter 3, allowing sufficient loading of the adsorbent.

In variant A, the mercury-laden adsorbent is kept out or precipitated in the electrofilter 3 and fed together with the likewise deposited fly ash to an ash moistener 8. In this way, the loaded adsorbent is incorporated into the fly ash and taken off from the ash moistener 8 as mercury-rich solid which can be disposed of in a landfill.

In variant B of the process, the mercury-laden adsorbent goes together with the flue gas into the flue gas desulfurization plant 4 and is taken up in the scrubbing suspension (FDP suspension) there. The scrubbing suspension, which comprises both the open-hearth furnace coke as adsorbent and also gypsum, is then conveyed from the bottom of the flue gas desulfurization plant 4 to the cyclone precipitator 5. The underflow from the cyclone precipitator 5 is enriched in the gypsum crystals, and the overflow contains the finer adsorbent particles which are loaded with mercury. The mercury-laden open-hearth furnace coke suspension can be subjected to a chemical after-treatment, in which the mercury bound to the adsorbent can then be precipitated. As an alternative, the wastewater comprising the open-hearth furnace coke suspension can be supplied to the ash moistener 8, so that the adsorbent is incorporated into the fly ash and is likewise discharged together with the fly ash as mercury-rich solid which can be disposed of in a landfill.

LIST OF REFERENCE NUMERALS

1 Combustion plant
2 Denitrification apparatus
3 Electrofilter
4 Flue gas desulfurization plant
5 Cyclone precipitator
6 Wet milling apparatus
7 Flue gas channel
8 Ash moistener

What is claimed is:

1. A process for removing mercury from flue gas from a combustion plant, comprising:
   a) providing an adsorbent selected from a group consisting of activated carbon, activated coke, molecular sieves, carbon molecular sieves and mixtures of the abovementioned adsorbents;
   b) producing an aqueous suspension comprising the adsorbent;
   c) introducing the suspension into a flue gas stream of the combustion plant of the flue gas and loading the adsorbent with mercury over a predetermined reaction path;
   d) keeping the adsorbent loaded with mercury out of the flue gas stream by one or more removal methods selected from a group consisting of a dry offgas purification and a wet offgas purification; and
   e) land filling or regenerating the adsorbent loaded with mercury,
   wherein the process comprises a wet flue gas desulfurization, wherein a carbon-enriched adsorbent which is based on brown coal and has been activated in an absence of oxygen is used as the adsorbent according to process step a), in that the introduction of the suspension as per process step c) into a dry, water vapor-undersaturated gas phase of the flue gas is effected upstream, in a flow direction of the flue gas, of the flue gas desulfurization, at a temperature of the flue gas in a range from 100° C. to 220° C.

2. The process as claimed in claim 1, wherein the adsorbent is wet milled for producing the suspension in process step b).

3. The process as claimed in claim 2, wherein the milling of the adsorbent is carried out using a ball mill.

4. The process as claimed in claim 3, wherein the ball mill is a stirred ball mill.

5. The process as claimed in claim 2, wherein the adsorbent is wet milled to an average particle diameter in a range from 10 to 20 µm.

6. The process as claimed in claim 1, wherein the introduction of the suspension in process step c) is effected by injection into a flue gas channel of the combustion plant, using spray nozzles distributed over a cross section of the flue gas channel.

7. The process as claimed in claim 6, wherein single-fluid nozzles are employed as spray nozzles.

8. The process as claimed in claim 1, wherein the suspension comprises from 3% to 30% by weight of solid.

9. The process as claimed in claim 8, wherein the suspension comprises from 5% to 15% by weight of solid.

10. The process as claimed in claim 1, wherein the process comprises dry keeping-out of the mercury-laden adsorbent as per process step d) using at least one filter device selected from a group consisting of electrofilters, centrifugal precipitators, woven fabric filters, tube filters, filter cloths, bag filters and candle filters.

11. The process as claimed in claim 1, wherein halides selected from a group consisting of iodides, chlorides, sodium bromide, calcium bromide and hydrogen bromide are added to the suspension before process step c).

12. The process as claimed in claim 1, as process for removing mercury from flue gas from coal-fired power stations having a wet flue gas desulfurization plant.

* * * * *